Patented Aug. 8, 1933

1,921,582

UNITED STATES PATENT OFFICE 1,921,582

PROCESS OF PLASTICIZING AND DISPERSING CELLULOSE ACETATE

William Beach Pratt, Wellesley, and Ralph T. Halstead, Boston, Mass., assignors to Dispersions Process, Inc., Dover, Del., a Corporation of Delaware No Drawing. Application February 26, 1929
Serial No. 342,936

4 Claims. (Cl. 134—79)

This invention relates to the plasticization and dispersion of cellulose acetate, being especially concerned with steps by which cellulose acetate may be economically converted into a coherent plastic mass of a consistency permitting, for instance, ready application to fabric or dispersion in water. It also relates to the production of aqueous dispersions of cellulose acetate and the compounding of the plastic mass or such dispersions with other materials.

The cellulose acetate of commerce consists of a fluffy mass of crumbs or shreds which are insoluble in water. When used in the manufacture of artificial silk, films, or lacquers, it is customary practice to treat the cellulose acetate with a comparatively large amount of a solvent or plasticizing agent owing to the bulkiness of the cellulose acetate and its limited solubility.

In accordance with the present invention, however, cellulose acetate is plasticized with both plasticizing agents and water. The water not only apparently increases the plasticity of the cellulose acetate, but serves to condition the plasticized mass for dispersion in water, as a hydrophilic colloid may be really and uniformly incorporated throughout the mass, whereupon when more water is gradually worked thereinto, the mass undergoes a change of phase and becomes dispersed as minute particles in the aqueous medium.

Various materials, either water-soluble or water-insoluble, may be employed as plasticizing agents. When a water-soluble material such as phenol is used, it may be dissolved in water and cellulose acetate soaked in the aqueous solution, the water serving as a liquid vehicle and carrying the phenol through the cellulose acetate to effect its plasticization. The rate of plasticization may be accelerated by heating the aqueous solution, but its temperature should be maintained below that of the boiling point of the plasticizing agent so as to avoid its excessive loss by vaporization. The soaking treatment is preferably carried out in a bath in which a large excess of solution is present, so that the solution has opportunity to penetrate substantially all the shreds of cellulose acetate and to plasticize them into a coherent plastic mass which floats to the surface of the solution. The soaking treatment may be carried out with agitation, if desired, to effect intimate mixture between the solution and the shredded cellulose acetate as it is added thereto. After a coherent plastic mass has been obtained, excess solution may be squeezed from the plastic mass, whereupon it may be placed in a suitable mixer and manipulated therein to ensure thorough plasticization, whereupon it may be used as such or dispersed in water. When a water-soluble liquid such as cresol or wood creosote is used as a plasticizing agent, the agent is preferably dispersed in water with a suitable dispersing agent such as soap, whereupon the cellulose acetate may be added to the dispersion and its plasticization effected with heat and mixing if desired. In such cases, also, the water serves as a liquid vehicle and carries the plasticizing agent through the cellulose acetate to effect its plasticization. The dispersing agent carried into the plastic mass along with the plasticizing agent and water may serve to facilitate subsequent dispersion in water.

When a high boiling creosote or its fractions is used as a plasticizing agent, treatment with an aqueous dispersion of the agent may be carried out at relatively high temperatures, say, 212° F., to break the disperson and hasten plasticization of the cellulose acetate. When water-insoluble plasticizing agents are used without being dispersed in water, the water alone is preferably incorporated into the cellulose acetate, either before or after incorporation of the plasticizing agent, as such a process may be controlled without separating out the plasticizing agent. The cellulose acetate may, for instance, be placed in a mixer and gradually wet with water while the mixer is in operation, until it has been compacted, whereupon a plasticizing agent may be incorporated thereinto until a coherent plastic mass is obtained. Or the cellulose acetate may first gradually be wet with the plasticizing agent until a coherent plastic mass is obtained, whereupon water may be incorporated into the mass until no more can be absorbed thereby.

Using any one of the procedures hereinbefore described, a coherent plastic mass of cellulose acetate may be obtained containing, in addition to a plasticizing agent, a considerable quantity of water. Not only does the water apparently increase the plasticity and workability of the mass so that it may be handled on calender rolls and thus be applied to fabric, or moulded, or used for other purposes, but it permits the ready incorporation thereinto of material capable of being uniformly carried by water as a vehicle, such as water-soluble dyes, or other material, water-dispersed bodies such as latex, artificial dispersons of rubber, or dispersed asphalt, or solutions or suspensions of hydrophilic colloids. The plasticized cellulose acetate containing water may therefore be compounded with materials that otherwise could not readily be compounded therewith, as water may serve as a carrier for materials that solvents or plasticizers of cellulose acetate cannot carry well alone.

The plasticized cellulose acetate or cellulose acetate compound may be placed in a suitable mixer, preferably of the type used for mixing or compounding rubber, e. g., a Werner & Pfleiderer mixer, the mixer preferably being provided with a jacket so that mixing may be carried out under heat, if desired. While the mass is being manipulated, a hydrophilic colloid such as a soluble caseinate, soap, gum tragacanth, gum acacia, glycerine, saponin, or the like, may be incorporated thereinto, the water in the mass serving to carry the colloid uniformly therethroughout. Water may then be gradually added while manipulation is still taking place, until a change of phase occurs and the cellulose acetate or cellulose acetate compound disperses as minute particles in the aqueous medium, this change being apparent when the mass passes from a continuous or coherent state to a discontinuous state or thick paste, which may be diluted to any consistency with water.

The process of the present invention may best be appreciated by citing certain specific examples of procedure such as the following:

Example 1

Four thousand parts by weight of 10% phenol solution was heated to a temperature of about 50° C., whereupon 500 parts of cellulose acetate was added to the solution and allowed to soak of cellulose acetate gradually became plastic and cohered into a mass which floated on the phenol therein for about fifteen minutes. The shreds solution. When the mass was removed from the solution, it was found that the concentration of phenol in the solution remaining in the soaking bath had been reduced to 5%. The plastic mass after being drained free from excess solution was placed in a two-bladed mixer, excess water being squeezed from the mass as it was stretched and kneaded. At this time, the mass was uniformly smooth and plastic, and shreds of unplasticized cellulose acetate were no longer visible therein. Calculations indicated that about 200 parts of phenol and about 192 parts of water had been absorbed thereby. The mass was then manipulated for about 40 minutes, during which time it warmed to a temperature of about 50° C. An ammonium caseinate gel prepared by soaking 70 parts by weight of dry casein in 65 parts of water and 5 parts of 26° Baumé ammonia and then heating, was added to the mass in doses, that is, in amount so that it was taken up and uniformly distributed throughout the mass without breaking its continuous or coherent condition. Warm water was then gradually added until the mass dispersed in minute particles in the aqueous medium.

Example 2

Four hundred parts by weight of cresylic acid was dispersed in water to produce a 10% dispersion with 5% tallow chip soap based on the weight of cresol as the dispersing agent. To the dispersion at 50° C. was added 500 parts of cellulose acetate. The cellulose acetate was allowed to soak in the warm aqueous dispersion for about two hours, to ensure thorough penetration and plasticization, whereupon the resulting coherent plastic mass was removed and drained free from excess dispersion. Analysis showed that the cresol content of the dispersion in the soaking bath had been reduced to 5.5% and that the drained mass had absorbed about 180 parts of cresylic acid and about 200 parts of water. The mass was then dispersed in water as described in Example 1.

Example 3

Five hundred parts by weight of cellulose acetate, together with water in excess of that necessary to wet it, were gradually fed into a jacketed, two-bladed mixer over a period of about three-quarters of an hour, the mixture being heated by the passing of steam through the jacket to facilitate compacting it and to vaporize excess water. Five hundred parts of wood creosote was gradually added to the compacted mass over a period of about half an hour, at the end of which time a coherent, plastic mass containing about 200 parts of water was obtained. The mass was then dispersed in water as described in Example 1.

Example 4

Five hundred parts by weight of cellulose acetate and 400 parts by weight of wood creosote were gradually supplied to a two-bladed mixer over a period of about one hour, the fresh materials being added while a smooth plastic mass free from shreds was being produced in the mixer. Water at about 50° C. was gradually incorporated into the mass over a period of about one-half hour, until about 200 parts had been absorbed thereby. The plastic mass was then dispersed in water, as described in Example 1.

The coherent plastic mass of cellulose acetate produced in each of the examples of procedure hereinbefore given was characterized by its capacity to be stretched or pulled much in the same way as molasses candy, that is, without crumbling or falling apart, thus being distinguished from the crumbly gel-like solutions sometimes produced when cellulose acetate or other cellulose derivatives are dissolved. The coherent plastic mass permits of ready and uniform incorporation of water and hydrophilic colloids therethroughout and makes possible the production of aqueous dispersions of fine particle size.

Aqueous dispersions of cellulose acetate produced as hereinbefore described may be used for various purposes in the arts, as, for example, in the manufacture of films. The use of plasticizing agents such as phenol or cresol, together with colloids such as gum tragacanth, gum acacia, and gelatine, makes possible the production of transparent or translucent films. The chracteristics of the film partly depend upon the amount of plasticizer used, the use of a comparatively large amount making possible the production of continuous films, since when the film is dried, particularly at elevated temperatures, the plasticizer apparently fuses together the dispersed particles of cellulose acetate as the water is removed and the cellulose acetate and plasticizer become the continuous phase. The dispersion may be mixed or compounded with water-soluble or water-dispersed bodies. It may be incorporated into fibrous material such as cellulose and/or asbestos pulp in the beater engine, and the dispersed material coagulated on the fibers by the addition of a suitable electrolyte such as alum, before running off on a paper machine. It may be mixed with fibrous material such as cellulose and/or asbestos pulp and rolled out into sheet material or moulded under heat and pressure, if desired, into articles, the cellulose acetate serving to bind the fibers together and to waterproof the product. Or it may be mixed with fillers such as wood flour or kieselguhr to produce a plastic composition suitable for moulding. The dispersion may also be used to impregnate fibrous sheet material such as papers, felts, and fabrics, the impregnated product being used for such purposes as in the manufacture of shoe stiffeners, such as box toes.

One of the advantages of the process hereinbefore described is that plasticizing agents such as phenol or cresol yield a coherent plastic mass which is dispersible in water, as hereinbefore described, when various types of cellulose acetate are used as raw material. For instance, it makes possible the use of the chloroform-soluble type of cellulose acetate, as well as the acetone-soluble and alcohol-soluble types. Another advantage is that dispersions of cellulose acetate may be prepared containing a minimum amount of water, as the amount of water present in the finished dispersion may be controlled so that little, if any, water in excess of that necessary to constitute it the continuous phase may be used, whereupon the dispersion may be diluted to any desired water content. Such a process, however, differs materially from one in which a material to be dispersed is added directly to a large body of water in excess of that necessary to constitute the water of the continuous phase.

We claim:

1. A process of dispersing cellulose acetate in water which comprises incorporating a plasticizing agent into cellulose acetate to produce a coherent plastic mass, incorporating a hydrophilic colloid into the mass, and gradually manipulating water thereinto until a change of phase takes place and the cellulose acetate disperses in the aqueous medium.

2. A process of dispersing cellulose acetate in water which comprises incorporating a plasticizing agent and water into cellulose acetate to produce a coherent plastic mass, incorporating a hydrophilic colloid into the mass, and gradually manipulating water thereinto until a change of phase takes place and the cellulose acetate disperses in the aqueous medium.

3. A process of dispersing cellulose acetate in water which comprises incorporating an aqueous solution of a plasticizing agent into cellulose acetate to produce a coherent plastic mass, incorporating a hydrophilic colloid into the mass, and gradually manipulating water thereinto until a change of phase takes place and the cellulose acetate disperses in the aqueous medium.

4. A process of dispersing cellulose acetate in water which comprises incorporating an aqueous dispersion of a plasticizing agent into cellulose acetate to produce a coherent plastic mass, incorporating a hydrophilic colloid into the mass, and gradually manipulating water thereinto until a change of phase takes place and the cellulose acetate disperses in the aqueous medium.

WILLIAM BEACH PRATT.
RALPH T. HALSTEAD.